United States Patent
Wang

(10) Patent No.: US 10,169,615 B2
(45) Date of Patent: Jan. 1, 2019

(54) METHODS AND APPARATUSES FOR ENCRYPTION AND DECRYPTION

(71) Applicant: I-PATROL TECHNOLOGY LIMITED, Hong Kong (CN)

(72) Inventor: Yi Wang, Hong Kong (CN)

(73) Assignee: I-Patrol Technology Limited, Hong Kong (CN)

( * ) Notice: Subject to any disclaimer, the term of this patent is extended or adjusted under 35 U.S.C. 154(b) by 310 days.

(21) Appl. No.: 14/704,232

(22) Filed: May 5, 2015

(65) Prior Publication Data

US 2015/0235054 A1    Aug. 20, 2015

Related U.S. Application Data

(63) Continuation of application No. PCT/CN2013/073275, filed on Mar. 27, 2013.

(30) Foreign Application Priority Data

Feb. 4, 2013    (CN) .......................... 2013 1 0043388

(51) Int. Cl.
G06F 21/72    (2013.01)

(52) U.S. Cl.
CPC .................... *G06F 21/72* (2013.01)

(58) Field of Classification Search
USPC ........ 713/150, 163, 181, 192; 726/2, 21, 36; 380/255, 264, 276
See application file for complete search history.

(56) References Cited

U.S. PATENT DOCUMENTS

| | | | | |
|---|---|---|---|---|
| 6,363,485 | B1 * | 3/2002 | Adams | H04L 9/304 713/186 |
| 2007/0239994 | A1 * | 10/2007 | Kulkarni | G06F 21/602 713/189 |
| 2008/0086639 | A1 * | 4/2008 | Kono | G06F 21/72 713/168 |
| 2008/0235515 | A1 * | 9/2008 | Yedidia | G06K 9/00073 713/186 |
| 2009/0287930 | A1 * | 11/2009 | Nagaraja | H04L 9/08 713/171 |
| 2010/0017618 | A1 * | 1/2010 | Golic | G06K 9/00288 713/186 |

(Continued)

FOREIGN PATENT DOCUMENTS

| | | |
|---|---|---|
| CN | 101419652 A | 4/2009 |
| CN | 102185694 A | 9/2011 |

OTHER PUBLICATIONS

International Search Report of Application No. PCT/CN2013/073275, from the State Intellectual Property Office of China, dated Nov. 14, 2013.

(Continued)

*Primary Examiner* — Sharif E Ullah
(74) *Attorney, Agent, or Firm* — Finnegan, Henderson, Farabow, Garrett & Dunner LLP

(57) ABSTRACT

An encryption method includes: obtaining a user feature of a user; performing, using a hardware logic circuit, a logical operation on the obtained user feature to generate a hardware encryption function; and encrypting first application data with the generated hardware encryption function to obtain second application data.

10 Claims, 6 Drawing Sheets

(56) References Cited

U.S. PATENT DOCUMENTS

| | | | | |
|---|---|---|---|---|
| 2011/0123028 A1* | 5/2011 | Karabinis | ................ | H04B 1/69 |
| | | | | 380/270 |
| 2012/0303966 A1* | 11/2012 | Hubner | ............ | G06Q 20/40145 |
| | | | | 713/186 |
| 2013/0238906 A1* | 9/2013 | Khoury | ............... | G06F 21/6218 |
| | | | | 713/193 |

OTHER PUBLICATIONS

Written Opinion of the International Searching Authority for Application No. PCT/CN2013/073275, from the State Intellectual Property Office of China, dated Nov. 14, 2013.

* cited by examiner

METHODS AND APPARATUSES FOR ENCRYPTION AND DECRYPTION

CROSS-REFERENCE TO RELATED APPLICATIONS

This application is a continuation of International Application No. PCT/CN2013/073275, filed Mar. 27, 2013, which claims priority from Chinese Patent Application No. 201310043388.9, filed Feb. 4, 2013, the entire contents of all of which are incorporated herein by reference.

TECHNICAL FIELD

This disclosure generally relates to the field of data security and, more particularly, to methods and apparatuses for encryption and decryption.

BACKGROUND

Conventional encryption protection mechanisms are generally based on a public key infrastructure (PKI) that uses a public key and a private key. The distribution and storage of the public key and the private key may weaken the overall security of an encryption system.

A digital rights management (DRM) system is conventionally used to protect commercial content. The application of the DRM system generally involves a series of complex system integrations at a server, issuance of a content encryption key, and support of a transmission platform and user terminals, which can cause inconvenience to a user. For example, when the user purchases media content, the user may also have to purchase and install hardware and software in support for a DRM client.

In addition, when two users need secure exchange of information or communication, both users generally need to install specific software and set an account password. Furthermore, the users may need to perform a large number of input operations for the secure exchange of information or communication, which also causes inconvenience to the users.

SUMMARY

According to a first aspect of the present disclosure, there is provided an encryption method, comprising: obtaining a user feature of a user; performing, using a hardware logic circuit, a logical operation on the obtained user feature to generate a hardware encryption function; and encrypting first application data with the generated hardware encryption function to obtain second application data.

According to a second aspect of the present disclosure, there is provided a decryption method, comprising: obtaining a user feature of a user; performing, by a hardware logic circuit, a logical operation on the user feature to generate a hardware decryption function; and decrypting, using the hardware decryption function, second application data, the second application data being encrypted from first application data by a hardware encryption function corresponding to the hardware decryption function.

According to a third aspect of the present disclosure, there is provided an apparatus, comprising: a feature obtaining unit configured to obtain a user feature of a user; a hardware logic circuit configured to perform a logical operation on the obtained user feature to generate a hardware function; and a processor configured to perform an encryption or a decryption of application data using the hardware function.

According to a fourth aspect of the present disclosure, there is provided an apparatus, comprising: a mobile terminal; and an encryption accessory including a hardware logic circuit; wherein the mobile terminal is configured to obtain a user feature of a user for sending to the encryption accessory; the encryption accessory is configured to perform, using the hardware logic circuit, a logical operation on the user feature to generate a hardware function for returning to the mobile terminal; and the mobile terminal is further configured to perform an encryption or a decryption of application data with the hardware function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
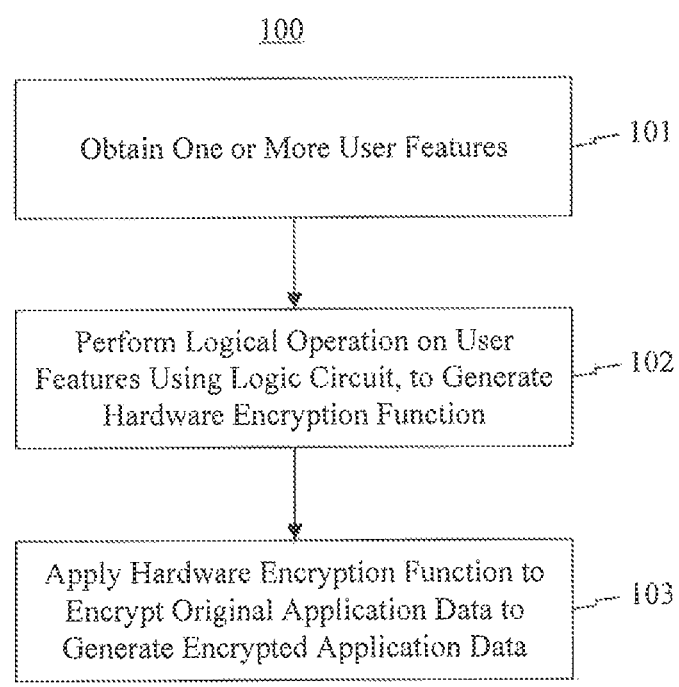
FIG. 1 is a flowchart of an encryption method, according to an exemplary embodiment.

FIG. 1 is a flowchart of an encryption method 100 for use in an apparatus, according to an exemplary embodiment. Referring to FIG. 1, the method 100 includes the following steps.

In step, 101, the apparatus obtains one or more user features of a user. For example, the user features may be the user's biological features, a user operating habit, specific hardware features used by the user, etc.

In step 102, the apparatus performs a logical operation on the user features using a logic circuit, to generate a hardware encryption function.

In exemplary embodiments, the logic circuit is a field programmable gate array (FPGA). The FPGA is developed from programmable array logic (PAL), gate array logic (GAL), complex programmable logic device (CPLD), and other programmable devices. The FPGA is a semi-custom circuit in the application specific integrated circuit (ASIC) field, not only resolving certain deficiencies of a conventional custom circuit but also overcoming the disadvantage of the limited number of gate circuits of traditional programmable devices. Editable components in the FPGA can be used for implementing basic logic gate circuits, such as AND, OR, XOR, and NOT, and complicated combination functions, such as decoders or math equation solvers.

In exemplary embodiments, the logical operation performed by the apparatus can be a Hash operation, which will be described below.

In exemplary embodiments, the generated hardware encryption function can be used for encrypting application data. After the encryption, when the user needs to use the application data, the user can enter the user's features, which may not be exactly the same as those for generating the hardware encryption function and can be within a certain scope of error correction, to generate a hardware decryption function corresponding to the hardware encryption function, and the apparatus can thus decrypt the encrypted application data with the hardware decryption function. The hardware encryption function can be consistent with the hardware decryption function, or match the hardware decryption function.

Accordingly, the user features and the hardware of the logic circuit can be bound together, which increases encryption security.

In step 103, the apparatus applies the hardware encryption function to encrypt the original application data to generate encrypted application data.

In the illustrated embodiment, the user features and the hardware logic circuit constitute an encryption channel for protection of the application data. The encrypted application data can be decrypted when a match between the user features and the hardware logic circuit is satisfied. In addition to the protection of the application data, the encryption channel is related with the user features and, thus, provides a convenient operation for the user.

In addition, the apparatus first obtains the user features and then performs the logical operation on the user features using the hardware logic circuit, to generate the hardware encryption function and fulfill the binding of the user features and the hardware logic circuit. The apparatus further encrypts the application data with the hardware encryption function. When the user needs to use the application data, the user enters the user features bound previously, which is simple and fast. The match of the user features and the hardware logic circuit is required to generate the hardware decryption function, which increases security.

Further, the binding of the hardware logic circuit and the user features, such as the user's biological features, the user's operating habit, and specific hardware features used by the user, establishes a corresponding relation, which not only enhances operating convenience of the user, for example, there is no need to enter a password or remember a verification code, but also improves security, because there is no need to transmit the password through a network or to store the password, and the user features are difficult to be replicated.

Figure 2:
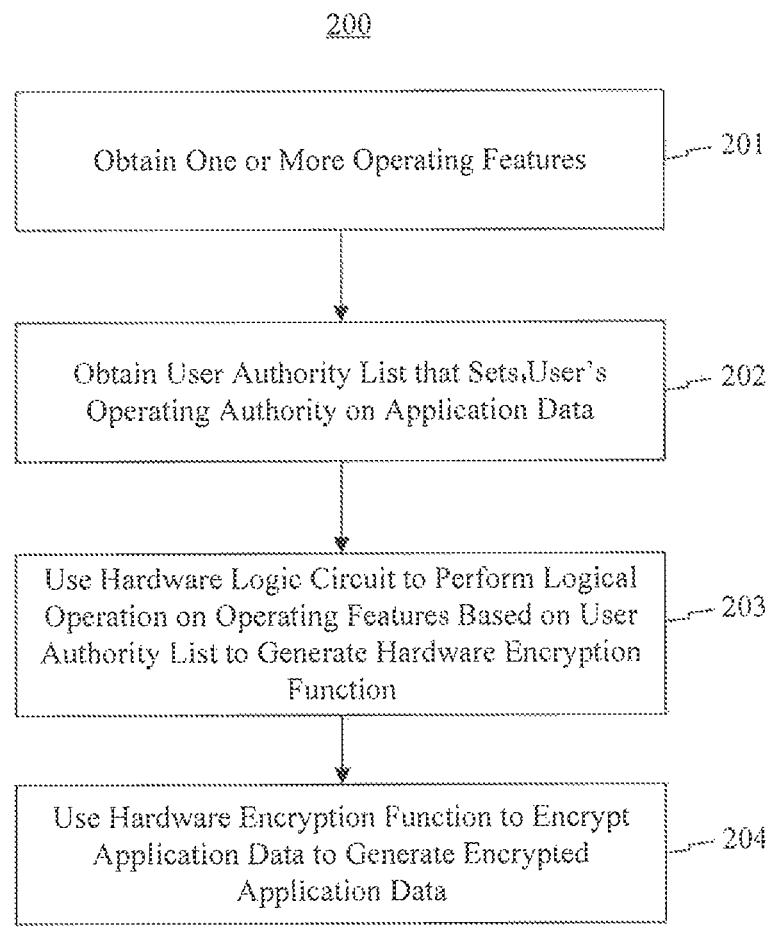
FIG. 2 is a flowchart of an encryption method, according to an exemplary embodiment.

FIG. 2 is a flowchart of an encryption method 200 for use in an apparatus, according to an exemplary embodiment. Referring to FIG. 2, the method 200 includes the following steps.

In step 201, the apparatus obtains one or more operating features of a user.

In the present disclosure, operating features include operating features of the user and a user terminal identification. For example, the operating features include features provided to the apparatus through an operation specified by the user, and the user terminal identification is used to limit the user terminal that can use application data, which can be a model number of the user terminal or an international mobile equipment identity (IMEI) of the user terminal.

In exemplary embodiments, the operating features can be a specified operation, a biological feature of the user, input characters, or any combination thereof, and is a multifactoral feature input. The apparatus can register multiple user features of the user, e.g., the specified operation, the biological feature, and the input characters, and each user feature is used as an input factor of encryption and decryption.

In exemplary embodiments, the specified operation can be any operation specified by the user, such as a sliding operation along a predetermined path on a touch screen of the apparatus. In one exemplary embodiment, the apparatus includes a pressure sensor. When the apparatus obtains user features, the user can uniformly press the touch screen by a finger and a pressure distribution on a contact area of the finger will form a Gaussian distribution. Due to more force being in the middle and less being in the margin of the contact area, the apparatus records the pressure distribution data generated by the finger as the user feature.

In exemplary embodiments, the biological features of the user can be the user's fingerprint, voice, pupil, etc.

In exemplary embodiments, the input characters can be a part of a password input through a keyboard.

In step 202, the apparatus obtains a user authority list that sets the user's operating authority on application data. The user authority list is convenient for an administrator to conduct flexible management for end users of application data, with authorization indication information for specified parameter setting.

In one exemplary embodiment, the apparatus obtains the user features and uses a hardware logic circuit in the apparatus to generate a hardware encryption function. The apparatus then encrypts application data e.g., of an incoming telephone call, using the hardware encryption function, thereby forming an encryption channel for the call. For example, the user can set a telephone number, an area code, or other feature information corresponding to the specific incoming telephone call through the user authority list. Also for example, a telephone number directory of the user can be stored in the user authority list. If the user wants to conduct an encrypted communication for a certain telephone number, the user can enable the certain telephone number in the user authority list to be bound to the hardware encryption function. When the apparatus receives the incoming telephone call, the apparatus will determine whether the incoming telephone call comes from the certain telephone number. If so, application data relating to the call will be encrypted by the hardware encryption function. When the user answers the call, the user enters the user features, based on which the apparatus performs a logical operation on the encrypted application data using the hardware logic circuit to generate a hardware decryption function. Then, the apparatus applies the hardware decryption function to decrypt the encrypted application data of the call.

It is understandable that a user authority list can be also implemented in other forms, such as tables. The method 200 is not so limited.

In step 203, the apparatus uses the hardware logic circuit to perform a logical operation on the operating features based on the user authority list to generate the hardware encryption function. In addition, the apparatus can additionally use the user terminal identification to generate the hardware encryption function. As a result, the user can access the application data from a specific user terminal, which further enhances the degree of security.

In step 204, the apparatus uses the hardware encryption function to encrypt the application data to generate encrypted application data.

In exemplary embodiments, the apparatus can use an input mode of multiple user features and set a fault tolerance range for certain user features. Accordingly, encrypted application data can be decrypted when inputted user features for decryption match the user features for encryption within the fault tolerance range.

Figure 3:
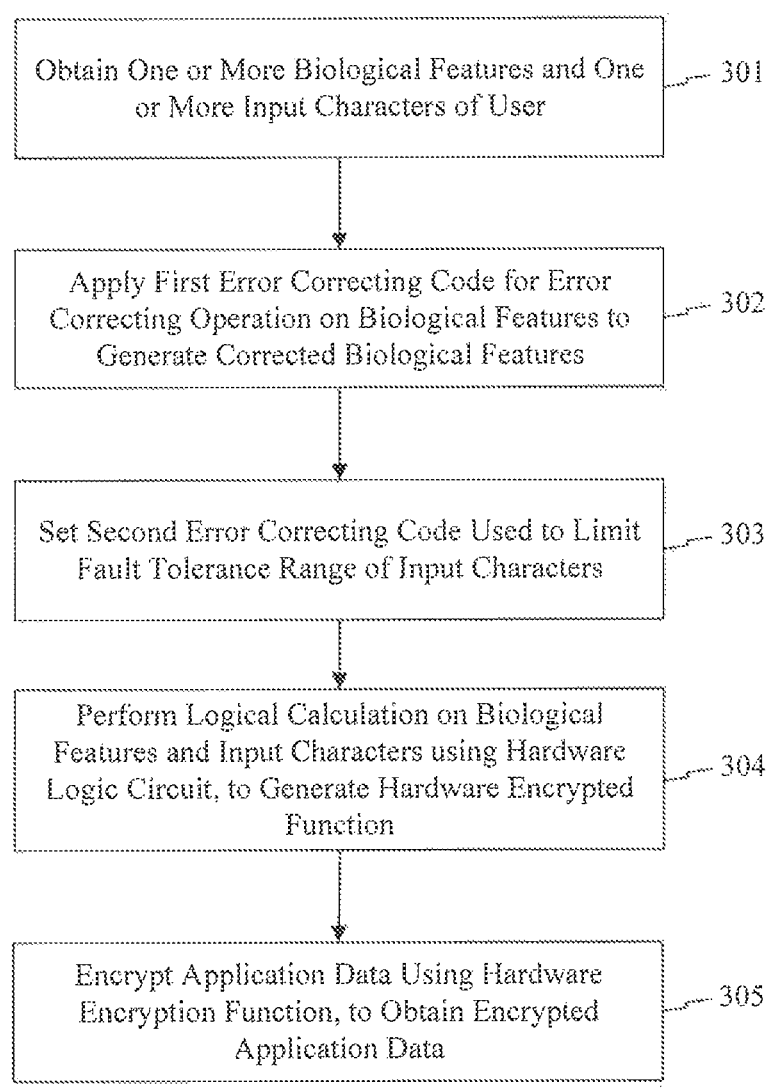
FIG. 3 is a flowchart of an encryption method, according to an exemplary embodiment.

FIG. 3 is a flowchart of an encryption method 300 for use in an apparatus, according to an exemplary embodiment. Referring to FIG. 3, the method 300 includes the following steps.

In step 301, the apparatus obtains one or more biological features of a user, such as a fingerprint, and one or more input characters of the user, such as a password set by the user. It is noted that the apparatus can obtain multiple user features, and the biological features and the input characters are for illustrative purposes only.

In step 302, the apparatus applies a first error correcting code for an error correcting operation on the biological features to generate corrected biological features. In a practical application, from the perspective of user operation or data collection at the apparatus, error may occur when the user re-enters the biological features. Therefore, a fault tolerance range can be set when obtaining the biological features the first time. This can be implemented by, for example, performing the error correction operation on the initially entered biological features using the first error correcting code to obtain the corrected biological features within the fault tolerance range.

In exemplary embodiments, when decrypting encrypted application data, the apparatus obtains the biological features of the user, obtains a current error correcting code by decoding the correlated result of the obtained biological features with the stored corrected biological features, i.e., the registered biological features, and use the current error correcting code to obtain the originally entered biological features (when the currently obtained biological features are within the error tolerance range) by a reverse error correction operation using the current error correction code and the corrected biological features. If the currently obtained biological features for decryption are beyond the error tolerance range, the apparatus will obtain an incorrect result for the initially entered biological features. Accordingly, the encrypted application data will not be successfully decrypted.

For example, assuming that the initially entered biological feature is F when the user first registers, and an error correction code (ECC) is set to be, e.g., a Reed-Solomon random code RS. Accordingly, the corrected biological feature EF=F⊕RS, where "⊕" represents a bit-wise exclusive-or operation.

When the user uses the apparatus for decryption, the currently entered biological feature is F'. F' being approximately the same as F. If a difference between F' and F is within the tolerance range, an error correction decoding calculation can obtain the error correcting code RS, i.e., RSdecode(F'⊕EF)=RS. The initially entered biological feature F can then be obtained through RS⊕EF=RS⊕RS⊕F=F.

Accordingly, in the above embodiment, the currently entered biological feature within the fault tolerance range is considered the same as the initially entered biological feature. That is, if the currently entered biological feature F' is within the error correction range, the original error correcting code RS can be obtained through the error correction decoding calculation, and the initially entered biological feature F can be obtained through the error correction calculation on F'. If the currently entered biological feature F' is not within the error correction range, F cannot be obtained through the error correction calculation on F'.

In step 303, the apparatus sets a second error correcting code for decoding application data, the second error correcting code being used to limit a fault tolerance range of input characters.

For example, the fault tolerance range of input characters can be set considering the entered biological features and security need in a practical application. When the second error correction code is set, weights can be set for the biological features and the input characters, respectively, and the second error correcting code can be determined according to the weights of the biological features and the input characters, respectively.

When decrypting encrypted application data, the apparatus obtains the user's biological features for decoding and also obtains the user's input characters. The apparatus uses the second error correcting code to perform an error correction calculation on the input characters to obtain corrected input characters and then, according to the corrected input characters, the obtained biological features for decoding, and the corrected biological features, obtains the current error correcting code. The apparatus further performs a reverse error correcting calculation using the current error correcting code and the corrected biological features to obtain the initially entered biological features. If the obtained biological features for decoding are beyond the fault tolerance range, the apparatus will obtains an incorrect result for the initially entered biological features. Accordingly, the encrypted application data will not be successfully decrypted.

In exemplary embodiments, the first error correcting code and the second error correcting code can instead be set as one error correcting code after calculation. The setting method can be decided according to need.

For instance, when the encryption method 300 is based on multiple factors, including multiple biological features, such as a fingerprint, a finger joint, a palm print, a face, a vocal sound, an eye iris, respectively represented by Fn1, Fn2, Fn3, . . . Fn6, input characters, such as a password represented by Fnp, and a message verification code represented by Fns, the user features F correspond to a point in a multi-dimensional space n1+n1+n3+n4+n5+n6+np+ns:

$$F=(Fn1,Fn2,Fn3,Fn4,Fn5,Fn6,Fnp,Fns).$$

Based on step 302, if the user features are F during registration, and the error correcting code is set to be RS, the corrected biological features EF=F⊕RS.

When the apparatus is used for decryption, the entered features are F':

F'=(F'n1, F'n2, F'n3, F'n4, F'n5, F'n6, F'np, F'ns). F' is approximately the same as F. If a difference between F' and F is within the tolerance range, the apparatus can perform an error correction decoding calculation to obtain the original error correcting code RS code, i.e., RSdecode(F'⊕EF)=RS. F can then be obtained through RS⊕EF=RS⊕RS⊕F=F.

In the above embodiment, the biological features, the input characters of the password, and the message verification code are each allowed to have a certain level of error correction. The initially entered user features can be obtained even when the currently entered password, verification code, and biological features include a certain level of errors.

In one exemplary embodiment, different user features can be assigned different feature weights. For example, a fingerprint can be an over 90% match, and a face recognition can be an over 95% match. In addition, the importance of the password and the verification code can be higher than the vocal sound, etc. An error correcting code RS_i can be assigned to a corresponding feature Fn_i, and the error correcting code RS_i can be set based on a weight w_i. For instance, the weights for Fn_i and Fn_j can be set to be 0.9 and 0.95, respectively. Accordingly, the corresponding error correcting codes RS_i and RS_j need to have error correcting ability over 90% and 95%, respectively.

In exemplary embodiments, when setting user features of multiple factors, relevant feature weights can be assigned to different features, or deciding the weight of one feature according to the weight of another feature. For instance, first and second feature weights can be set for a first operating feature; and third and fourth feature weights can be set for a second operating feature, the first feature weight matching the third feature weight, and the second feature weight matching the fourth feature weight. When decoding, the first feature weight is used if the first feature is within a first fault tolerance range, and the third feature weight is used for the second operating feature. Alternatively, the second feature weight is used if the first feature is within a second fault tolerance range, and the fourth feature weight is used for the second operating feature.

In one exemplary embodiment, because the feature weight for the biological feature is higher than that of the password and the verification code, the biological feature is set as the basic feature, and the password and the verification code are set as supporting/extension features. Accordingly, in one implementation, the following relevant feature weights can be used for the error correcting code:

1) If the match of the biological feature is over 99%, the apparatus uses the error correcting code directly to obtain the initially entered user feature, and there is no requirement for the password or the verification code.

2) If the match of the biological feature is over 90% but below 99%, the password and the verification code are required to be entered, and the password and the verification code need to have error correcting ability over 90%. Accordingly, the apparatus can use the supporting (or the second) error correcting code to obtain the correct password and verification code if the error correction is successful, and then uses the basic (or the first) error correcting code to obtain combined user features.

3) If the match of the biological feature is over 80% but below 90%, the password and the verification code is required to be entered, and the password and the verification code need to have error correcting ability over 99%. That is, the lower the match of the basic feature, the higher the match of the supporting feature is.

In step 304, the apparatus performs a logical calculation on the biological features and the input characters using the hardware logic circuit, to generate a hardware encrypted function. The generated hardware encryption function can be used to encrypt application data that needs to be encrypted. After encryption, if the user needs to use the application data, the user can enter the user's feature within the error correcting range, and the apparatus can generate a hardware decryption function corresponding to the hardware encryption function using the hardware logic circuit. For example, the hardware decryption function can be set to match the hardware encryption function.

In step 305, the apparatus encrypts application data using the hardware encryption function, to obtain encrypted application data.

In the above embodiments, multiple factors, such as the user's specified operation, biological features, and input characters, can be applied in data encryption. Thus, the accuracy requirement for individual user features input by the user can be loosened. The apparatus can perform an automatic error correction during decryption when certain factors are inaccurately input by the user. As a result, both data security and user experience are improved.

In one exemplary embodiment, a group of N users wants to perform encrypted communication among the users. Each user i has a user feature F_i and an error corrected feature EF_i. Therefore, each user i can use the error corrected feature EF_i and the user's encryption accessory (described below) to register and match. Each user has communication hardware with a hardware feature P_i, such as 128-bit or 256-bit digits. Each user can register and match the user's features with the hardware and generate a hardware encryption function.

When user i communicates with one or more other users in the group, the encryption apparatus of the user i can take communication data and identifiers of the other users specified in the user authority list as input parameters of the hardware encryption function, and encrypt the communication data using the logic circuit of the hardware encryption function. The other users can decrypt the encrypted communication data using their respective encryption accessories.

Figure 4:
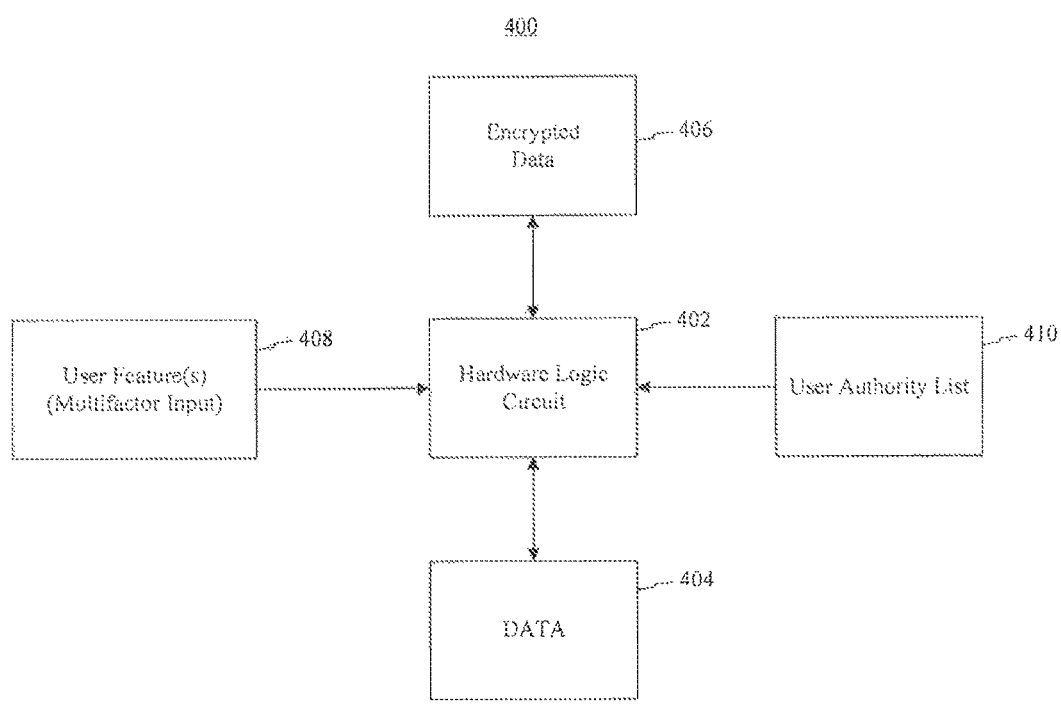
FIG. 4 is a diagram of an encryption method, according to an exemplary embodiment.

For example, FIG. 4 is a diagram of an encryption method 400, according to an exemplary embodiment. Referring to FIG. 4, a hardware logic circuit 402 can encrypt data 404 or decrypt encrypted data 406 using one or more inputted user features 408 and a user authority list 410, similar to the above description in connection with the methods 100 (FIG. 1), 200 (FIG. 2), and 300 (FIG. 3). In exemplary embodiments, the encryption method 400 may be implemented as follows.

First, a user registers and matches with an encryption accessory. For example, a user feature F is obtained when the user registers, and an error corrected feature EF is generated based on EF=F⊕RS, where ⊕ represents an exclusive-or operation and RS is the error correcting code. A value Index_i mapped from EF using a mapping function is taken as an identifier of the user. The mapping function can be a Hash function or a function based on a group key allocation method, such as a k-nearest neighbor method, a pattern classification method, or a machine learning method.

The user also registers and matches with a hardware module. For example, a user terminal identification is obtained as a physical identifier (PHY ID) P, and F and P are mapped to a hardware encryption function (HW Module) using a hardware logic circuit. The mapping function can be a Hash function, such as a function based on the SHA1 algorithm.

Next, the user uses the encryption accessory to encrypt data, including two steps A) and B):

A) The encryption accessory obtains the user feature F', and performs an error correction decoding, e.g., RS=F'⊕EF to obtain the code RS. The encryption accessory then obtains the user feature F by F=RS⊕EF, and map F and P to a hardware encryption function (HW Module) using a mapping function. The mapping function can be a Hash function, such as a function based on the SHA1 algorithm.

B) The encryption accessory encrypts data based on a permission identification Secret Channel Index Response Vector (SCIRV) in the user authority list as follows, with SCIRV[i]=1 indicating the user i can decrypt the data and SCIRV[i]=0 indicating otherwise (i.e., the user i cannot decrypt the data):

Input: (DATA, Index, SCIRV);
Output: (Encrypted DATA).

In exemplary embodiments, the hardware encryption function or the hardware decoding function can be implemented using a group key allocation management method. For example, a group key allocation method using broadcast encryption can be used, to achieve matching of users and their respective encryption accessories, matching of a sending user and hardware modules and encrypting data for specified receiving user(s), decrypting of the encrypted data by the decryption accessories of the respective specified receiving user(s). Below is an exemplary embodiment of a group key allocation method using broadcast encryption, including items 1-3.

Item 1. Generation of matching of users and corresponding hardware encryption functions:

1a) Generate a bilinear mapping group G based on a prime number p and a corresponding elliptic curve G^N;

1b) Randomize an initial system by randomly producing a generation element g of the group G that meets the requirements of the elliptic curve;

1c) Randomize the system by randomly generating an element a from a modular integer group Z_p;

1d) For i=1, 2, . . . , n, n+2, . . . , 2n, use the elliptic curve G^N and the bilinear mapping to generate $g\_i = g^{(a^i)}$;

1e) Randomly select an element r from the modular integer group Z_p that is bilinear co-prime to the element a;

1f) Calculate a corresponding point $v = g^r$ on the elliptic curve;

1g) Generate a public key PK=(g, g_1, . . . , g_n, g_n+2, . . . , g_2n, v), belonging to G^(2n+1);

1h) For each user i=1, 2, . . . , n, generate a private key d_i by the bilinear mapping of the elliptic curve: $d\_i = (g\_i)^r$;

1i) Register and match the users with their respective encryption accessories, and obtain the error correcting feature EF for the user i. For example, the value of EF is mapped to $Index\_i = d\_i = (g\_i)^r$ as the user's encryption accessory value using a mapping function based on a group key allocation method, such as a k-nearest neighbor method, a pattern classification method, or a machine learning method.

Item 2. A user sending data and a hardware module are registered and matched, to generate a hardware encryption function and encrypt data:

2a)—Assuming the sending user's correcting feature is EF_S, and a physical identifier (PHY ID) of the hardware is P, such as 128-bit or 256-bit digits, EF_S and P are mapped to an element t that is bilinear co-prime in the modular integer group Z_p, as the sending user's hardware encryption function. The mapping function can be a Hash function, such as a function based on the SHA1 algorithm.

2b) Generate g_1, g_(n+1);

2c) Use the bilinear mapping to calculate a point on the elliptic curve corresponding to e(g_n, g_1);

2d) Use the bilinear mapping and the elliptic curve to calculate e(g_(n+1), g);

2e) Generate an encryption key $K = e(g\_(n+1), g)^t$ using the bilinear mapping and the elliptic curve;

2f) Start an encryption channel by using K to encrypt data;

2g) Generate a public message H as follows, where S is a set of index values {i} such that SCIRV[i]==1:

$$H = \left(g^i, \left(v^{-i} \prod_{j \in S} g_{n+1-j}\right)^t\right) \in \mathbb{G}^2,$$

According to the above settings, users corresponding to Index_i=d_i and having the SCIRV[i] values equal to 1 in the set S can recover the encryption key K from the public message H, and then decrypt the encrypted data.

Item 3. Specified users decrypt received data, the specified users being those corresponding to SCIRV[i] values equal to 1 in the set S in the user authority list. For example, the encryption accessories of the respective specified users recover the encryption key K by using a hardware decryption function and decrypt the encrypted data using the received encryption key K.

3a) Perform a system randomization to generate a matching sequence on the elliptic curve;

3b) Calculate $$\prod_{j \in S} g_{n+1-j} \text{ and } \prod_{\substack{j \in S \\ j \neq i}} g_{n+1-j+i}$$

using the bilinear mapping and the elliptic curve;

3c) Obtain the public message H from a complete file header;

3d) Calculate (C_0, C_1) based on the bilinear mapping, where $$C\_0 = g^t,$$

and $$C\_1 = \left(v \cdot \prod_{j \in S} g_{n+1-j}\right)^t;$$

3e) Calculate the following using the bilinear mapping and the elliptic curve:

$$e(g_i, C_1) \Big/ e\left(d_i \cdot \prod_{\substack{j \in S \\ j \neq i}} g_{n+1-j+i}, C_0\right);$$

3f) Calculate the encryption key K as follows:

$$e\left(g^{(a^i)}, \left(v \cdot \prod_{j \in S} g_{n+1-j}\right)^t\right) \Big/ e\left(v^{(a^i)} \cdot \prod_{\substack{j \in S \\ j \neq i}} g_{n+1-j+i}, g^t\right).$$

According to encrypting settings, the users corresponding to Index_i=d_i and having SCIRV[i] values equal to 1 in the set S can recover the encryption key K from the public message H and decrypt the encrypted data. Accordingly, the encrypted data is decrypted using the hardware decryption function of the users i.

Figure 5:
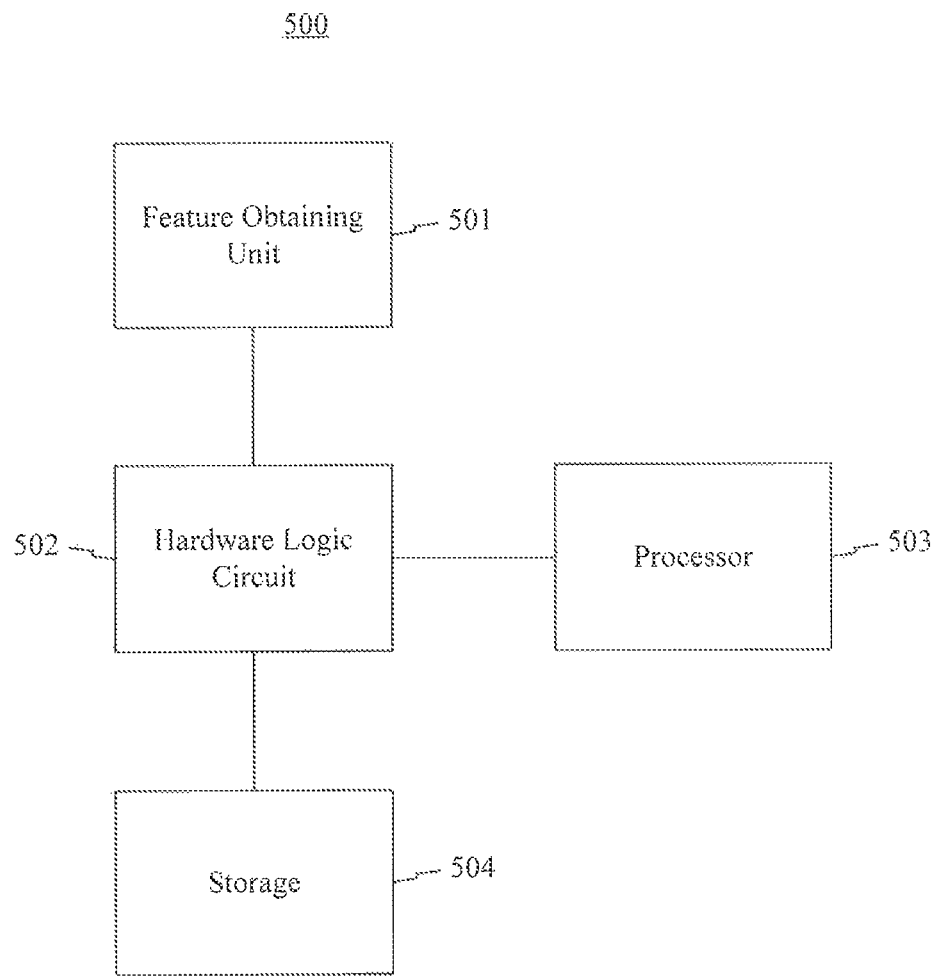
FIG. 5 is a block diagram of an encryption apparatus, according to an exemplary embodiment.

FIG. 5 is a block diagram of an encryption apparatus 500, according to an exemplary embodiment. The apparatus 500 is configured to perform any of the above-described methods. Referring to FIG. 5, the apparatus 500 includes a feature obtaining unit 501, a hardware logic circuit 502, and a processor 503.

In exemplary embodiments, the feature obtaining unit 501 is configured to obtain one or more user features and send the obtained user features to the hardware logic circuit 502. The hardware logic circuit 502 is configured to perform a logical calculation on the user features to generate a hardware encryption function, and provide the hardware encryption function to the processor 503. The processor 503 is configured to encrypt application data using the hardware encryption function. The processor 503 is also configured to decrypt encrypted application data using a hardware decryption function.

In exemplary embodiments, the feature obtaining unit 501 can be a touch screen, a video module, a recording module, a fingerprint acquiring module, a character input module, a model identification module, or any combination thereof. For example, the touch screen is configured to obtain the user's specified touch operations or fingerprints. Also for example, the video module is configured to obtain the user's pupil features. Further for example, the recording module is configured to obtain the user's vocal features.

In exemplary embodiments, the apparatus 500 also includes a storage 504 configured to store a user authority list that sets the user's operating authority on application data. For example, the storage 504 can be a memory device, an internal storage, an encrypted storage, such as a crypto-memory, or a calculating unit of digital logic encryption, which can obtain the user's operating authority through digital logic calculation.

In one exemplary embodiment, the apparatus 500 is a mobile terminal that includes the hardware logic circuit 502, a touch screen, a video camera, and/or a microphone as the feature obtaining unit 501, and a central processing unit (CPU) as the processor 503.

Figure 6:
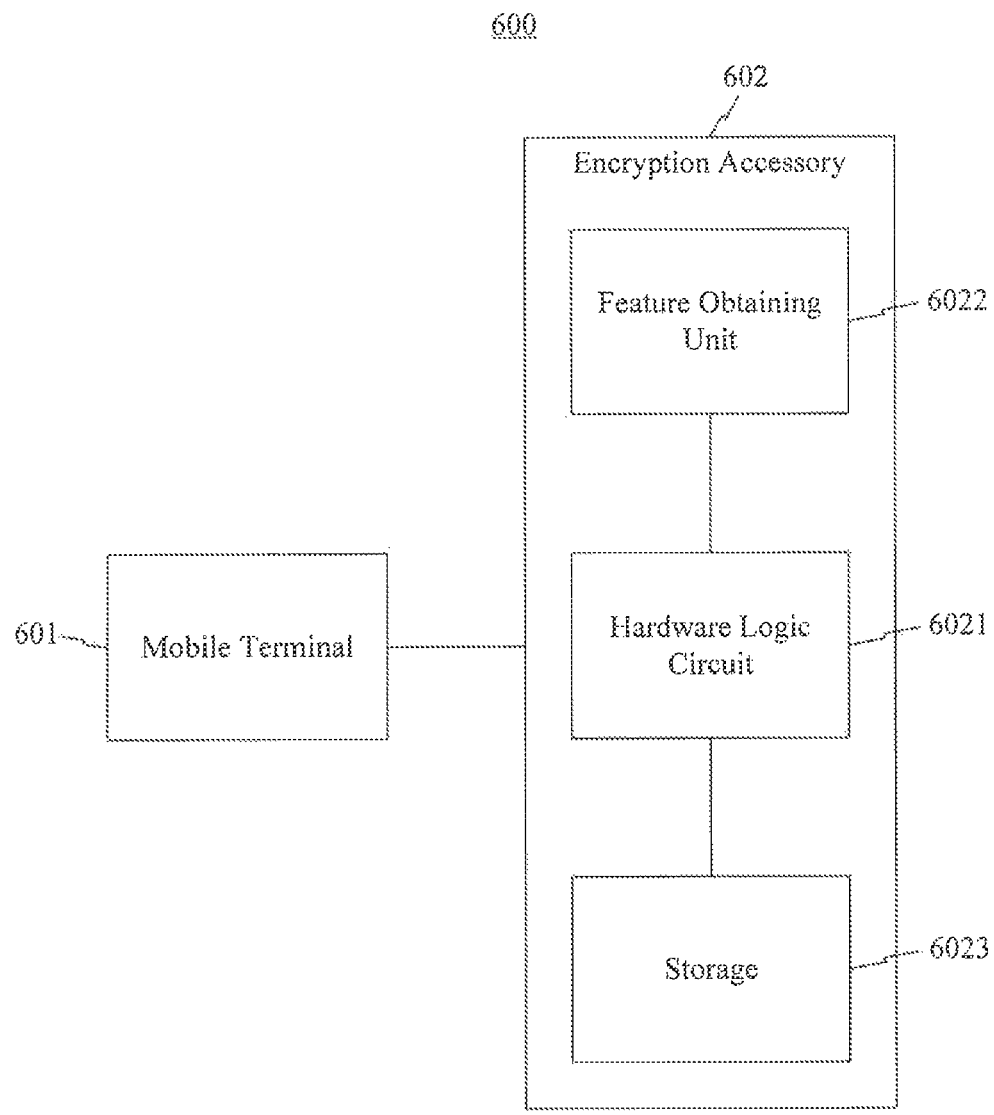
FIG. 6 is a block diagram of an encryption apparatus, according to an exemplary embodiment.

FIG. 6 is a block diagram of an encryption apparatus 600, according to an exemplary embodiment. The apparatus 600 is configured to perform any of the above-described methods. Referring to FIG. 6, the apparatus 600 includes a mobile terminal 601 and an encryption accessory 602 that includes a hardware logic circuit 6021.

In exemplary embodiments, the mobile terminal 601 is configured to obtain one or more user features and send the obtained user features to the encryption accessory 602. The encryption accessory 602 is configured to perform a logical calculation on the user features using the hardware logic circuit 6021 and generate a hardware encryption function and/or a hardware decryption function for returning to the mobile terminal 601. The mobile terminal 601 is also configured to encrypt application data using the hardware encryption function, or decrypt encrypted application data using the hardware decryption function.

In some embodiments, the encryption accessory 602 also includes a feature obtaining unit 6022 configured to obtain one or more user features and a storage 6023. The feature obtaining unit 6022 can be a video module, a recording module, a fingerprint acquiring module, or any combination thereof. The storage 6023 is configured to store a user authority list that sets the user's operating authority on application data.

In some embodiments, the mobile terminal 601 and the encryption accessory 602 are connected through a universal serial bus (USB), or a physical audio interface of the mobile terminal 601. In some embodiments, the mobile terminal 601 and the encryption accessory 602 can communicate through a wireless network, such as a Bluetooth network, a radio-frequency identification (RFID) network, a near field communication (NFC) network, an infrared network, a Zigbee network, or a wireless fidelity (WiFi) network.

In exemplary embodiments, the mobile terminal 601 includes a first audio transceiver (not shown), and the encryption accessory 602 includes a second audio transceiver (not shown). The first and second audio transceivers are configured to transmit data between the mobile terminal 601 and the encryption accessory 602, including the user features, the hardware encryption function, the hardware decryption function, etc.

In exemplary embodiments, data to be transmitted between mobile terminal 601 and the encryption accessory 602 can be converted through digital to analog converters (DACs) (not shown) in the mobile terminal 601 and in the encryption accessory 602. For example, the encryption accessory 602 can convert digital information including, e.g., the user features, the hardware identifier, etc. to audio signals, and the mobile terminal 601 then receives the audio signals through its microphone and converts the audio signals into digital information through analog to digital conversion (ADC).

One skilled in the art will understand that multiple units in the exemplary embodiments may be combined into one unit, and one unit may be divided into multiple units. Each unit may be implemented with software, hardware, or a combination of software and hardware. In addition, coupling between units or components of the above described apparatus can be direct coupling or communication therebetween, which may be electric, mechanical, or other couplings.

In exemplary embodiments, there is provided a non-transitory storage medium including instructions, executable by a processor, for performing the above described methods. The non-transitory storage medium can be a U disk, a mobile disk, a read-only memory (ROM), a random access memory (RAM), a magnetic disk, a CD disk, or any medium which can store program codes.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:
1. A digital data encryption method, comprising:
obtaining a user feature of a user, the user feature including at least one of an operating feature of the user or a user terminal identification, the operating feature including at least one of a specified operation, a biological feature, or an input character of the user;

performing, using a hardware logic circuit, a logical operation on the obtained user feature to generate a hardware encryption function;

encrypting, by a processor, first application data with the generated hardware encryption function to obtain second application data;

assigning, by the processor, corresponding feature weights for a plurality of different operating features;

setting, by the processor, a first feature weight and a second feature weight for a first operating feature, and setting, by the processor, a third feature weight and a fourth feature weight for a second operating feature, the feature weights being used to calculate weights of corresponding operating features within a fault tolerance range, the first feature weight matching the third feature weight, and the second feature weight matching the fourth feature weight; and during decryption of the second application data,
setting, by the processor, an error correcting code for the decryption of the second application data, the error correcting code determining at least one of a first fault tolerance range and a second fault tolerance range;

if the first operating feature is within the first fault tolerance range, applying, by the processor, the first feature weight for the first operating feature and applying, by the processor, the third feature weight for the second operating feature; and if the first operating feature is within the second fault tolerance range, applying, by the processor, the second feature weight for the first operating feature and applying, by the processor, the fourth feature weight for the second operating feature.

2. The method of claim 1, further comprising:
obtaining, by the processor, a user authority list that sets an operating authority of the user on corresponding application data; and
performing, by the hardware logic circuit, the logical operation on the user feature and the application data set by the user authority list.

3. A digital data decryption method, comprising:
obtaining a user feature of a user, the user feature including a first operating feature and a second operating feature of the user, the first and second operating features are associated with the user or a user terminal identification, wherein the obtaining of the first and second operating features comprises obtaining at least one of a specified operation, a biological feature, or an input character of the user;
performing, by a hardware logic circuit, a logical operation on the user feature to generate a hardware decryption function; and
decrypting, by a processor, second application data using the hardware decryption function, the second application data being encrypted from first application data by a hardware encryption function corresponding to the hardware decryption function, the decrypting comprising:
if the first operating feature is within a first fault tolerance range, applying, by the processor, a first feature weight for a weight calculation for the first operating feature and applying, by the processor, a third feature weight for a weight calculation for the second operating feature; and
if the first operating feature is within a second fault tolerance range, applying, by the processor, a second feature weight for a weight calculation for the first operating feature and applying, by the processor, a fourth feature weight for a weight calculation for the second operating feature.

4. The method of claim 3, wherein the decrypting comprises:
determining, by the processor, whether the user has operating authority on the first application data, based on a user authority list; and
decrypting, by the processor, the second application data if it is determined that the user has the operating authority.

5. The method of claim 3, further comprising:
obtaining the biological feature of the user;
performing, by the processor, an error correction operation on the obtained biological feature and a registered corrected biological feature, to obtain an error correcting code; and
applying, by the processor, the obtained error correcting code and the registered corrected biological feature for an inverse error correcting operation to obtain the user feature.

6. The method of claim 3, further comprising:
obtaining the biological feature and the input character of the user;
applying, by the processor, a first error correcting code on the input character to generate a corrected input character;
performing, by the processor, an error correction operation on the corrected input character, the obtained biological feature, and a registered corrected biological feature to obtain an error correcting code; and
applying, by the processor, the error correcting code and the registered corrected biological feature for an inverse error correcting operation to obtain the user feature.

7. The method of claim 3, further comprising:
obtaining multiple operating features of the user; and
applying, by the processor, a corresponding error correcting code on each of the operating features.

8. An apparatus, comprising:
a hardware logic circuit configured to perform a logical operation on a user feature of a user, to generate a hardware function, the user feature including at least one of an operating feature of the user or a user terminal identification, the operating feature including at least one of a specified operation, a biological feature, or an input character of the user;
one or more memory devices storing instructions; and
a processor executing the instructions to perform an encryption or a decryption of application data using the hardware function;
wherein during the encryption of the application data, the processor executes the instructions to:
assign corresponding feature weights for a plurality of different operating features;
set a first feature weight and a second feature weight for a first operating feature, and set a third feature weight and a fourth feature weight for a second operating feature, the feature weights being used to calculate weights of corresponding operating features within a fault tolerance range, the first feature weight matching the third feature weight, and the second feature weight matching the fourth feature weight; and
wherein during the decryption of the application data, the processor executes the instructions to:
set an error correcting code for the decryption of the application data, the error correcting code determining at least one of a first fault tolerance range and a second fault tolerance range;

if the first operating feature is within the first fault tolerance range, apply the first feature weight for the first operating feature and apply the third feature weight for the second operating feature; and if the first operating feature is within the second fault tolerance range, apply the second feature weight for the first operating feature and apply the fourth feature weight for the second operating feature.

9. The apparatus of claim 8, further comprising at least one of a touch screen, a camera module, a recording module, a fingerprint acquisition module, a character input module, or a model identification module, the touch screen being configured to obtain the specified operation and a fingerprint of the user, the camera module being configured to obtain a pupil feature of the user, the recording module being configured to obtain a speech feature of the user.

10. The apparatus of claim 8, wherein the one or more memory devices further store:

a user authority list that sets user authority on corresponding application data.

* * * * *